US006978119B2

(12) United States Patent
Chen

(10) Patent No.: US 6,978,119 B2
(45) Date of Patent: Dec. 20, 2005

(54) FAST CONNECTION ESTABLISHMENT METHOD FOR BLUETOOTH DEVICE

(75) Inventor: James Chen, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 511 days.

(21) Appl. No.: 10/194,212

(22) Filed: Jul. 15, 2002

(65) Prior Publication Data
US 2004/0203366 A1 Oct. 14, 2004

(30) Foreign Application Priority Data
May 29, 2002 (TW) .............................. 91111447 A

(51) Int. Cl.⁷ ............................................... H04B 5/00
(52) U.S. Cl. .................... 455/41.2; 455/41.3; 455/419; 455/420; 455/66.1; 455/67.7; 455/556.1
(58) Field of Search ............................. 455/41.2, 41.3, 455/419, 420, 66.1, 67.7, 556.1

(56) References Cited

U.S. PATENT DOCUMENTS 6,542,758 B1 * 4/2003 Chennakeshu et al. .. 455/569.2
2002/0091843 A1 * 7/2002 Vaid ............................ 709/230
2002/0098866 A1 * 7/2002 Yang ........................... 455/557
2002/0136214 A1 * 9/2002 Do et al. ..................... 370/392
2003/0050009 A1 * 3/2003 Kurisko et al. ............... 455/41

* cited by examiner

Primary Examiner—Nick Corsaro
Assistant Examiner—Minh D. Dao
(74) Attorney, Agent, or Firm—Bacon & Thomas, PLLC

(57) ABSTRACT

A fast connection establishment method for a bluetooth device is used to establish a connection between two bluetooth devices in order to provide a wireless transmission function. A bluetooth module, bluetooth address memory, CPU and connection interface for outside device are installed in each bluetooth device. The method first connects the three signal contacts of a bluetooth device to the three signal contacts of another bluetooth device to interchange the bluetooth addresses with each other. Then, the bluetooth address memory of the bluetooth device is used to store the bluetooth address of the opposite bluetooth device. After this, the bluetooth address is sent out after the power source of the bluetooth device is on. Finally, a bluetooth connection procedure is started if the bluetooth address of the opposite device is received by it in a specific time. Thereby, a wireless transmission can be established between two bluetooth devices.

11 Claims, 3 Drawing Sheets

FAST CONNECTION ESTABLISHMENT METHOD FOR BLUETOOTH DEVICE

TECHNICAL FIELD

The present invention relates to a fast connection establishment method for a bluetooth device, and more particularly to a method that the bluetooth addresses of two bluetooth devices are transmitted to each other and the connection procedure of them is activated by connecting them at their own three standard RS232 signal contacts.

BACKGROUND OF THE INVENTION

The connection procedure for bluetooth devices is complex, and it needs to spend time on searching another bluetooth device that wants to be connected. Therefore, it is inconvenient for users. Besides, the users cannot activate the searching and connection procedures if the bluetooth device is used on a device without user interfaces (such as a device without a screen and keyboard). Therefore, the application range of the bluetooth device is limited.

SUMMARY OF THE INVENTION

The present invention provides a fast connection establishment method for bluetooth device. The three standard RS232 signal contacts of two bluetooth devices that a connection will be built between them are connected together first, and then power source is switched on. The bluetooth device addresses are transmitted to each other immediately after the power source is switched on. A bluetooth connection procedure is started at once if a bluetooth device receives the bluetooth device address of another bluetooth device in a specific time. A photodiode on the bluetooth device is lighted to mention a user; the user then can separate the two devices and starts a wireless transmission.

One object of the present invention is to provide a fast connection establishment method for a bluetooth device so that the time for a bluetooth device to search another bluetooth device can be saved.

Another object of the present invention is to provide a fast connection establishment method for a bluetooth device, enabling a bluetooth device to be used on a device without any user interfaces.

Still another object of the present invention is to provide a fast connection establishment method, being helpful on promoting the application of bluetooth technology due to its simplicity.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
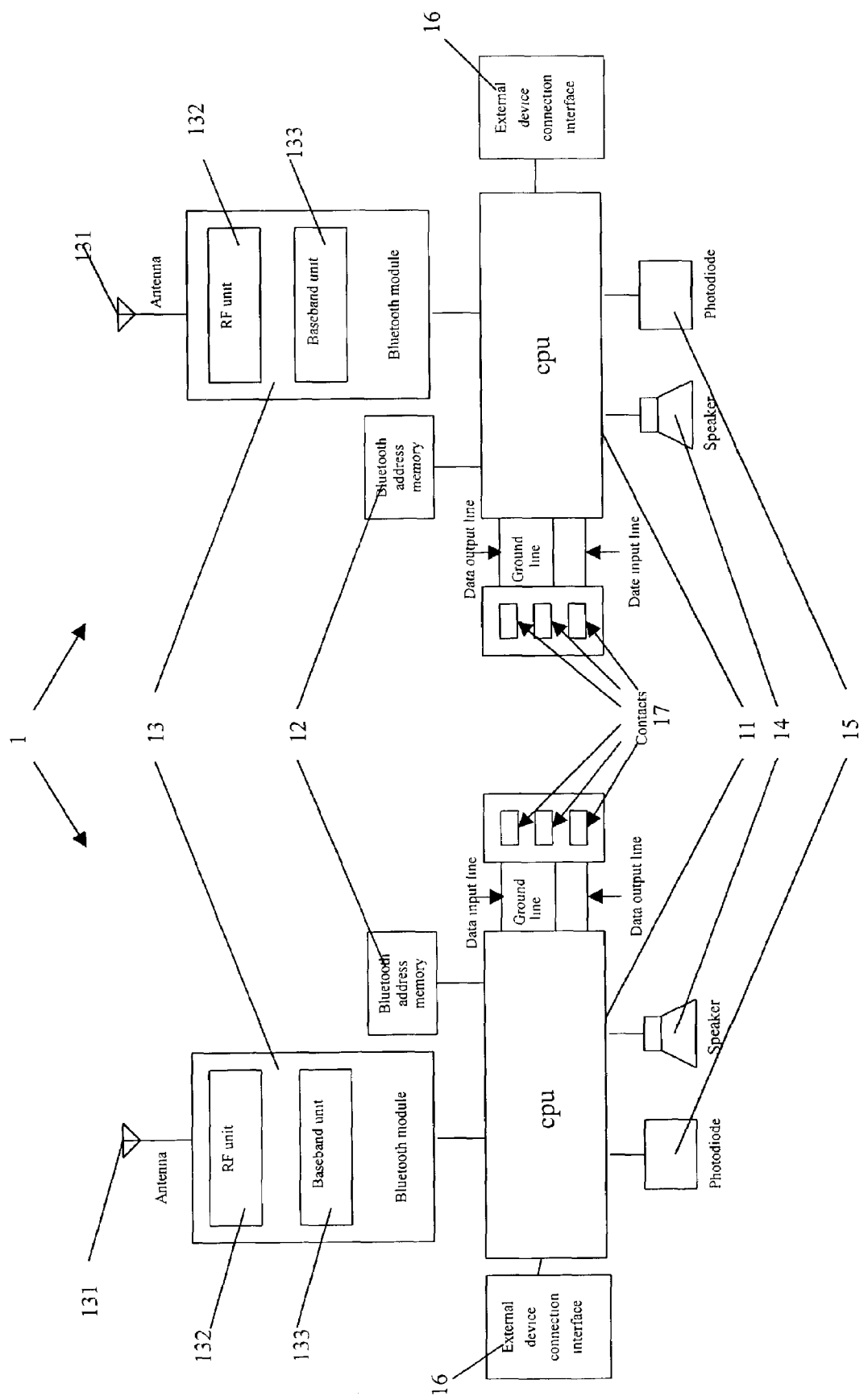
FIG. 1 is a block diagram, showing a circuit of a bluetooth device used in a fast connection establishment method of a preferred embodiment according to the present invention.

First, please refer to FIG. 1. FIG. 1 is a circuit block diagram of a bluetooth device according to the present invention. A bluetooth device 1 mainly comprises a CPU 11, bluetooth address memory 12, bluetooth module 13, speaker 14, photodiode 15, external device connection interface 16 and contacts 17. The bluetooth module 13 comprises an antenna 131, RF unit 132 and baseband unit 133, which are used to build a connection with other bluetooth devices. Three standard RS232 signal contacts (data input line Rx, ground line G and data output line Tx) are disposed on the bluetooth device 1, they are used to contact with three signal contacts (data output line Tx, ground line G and data input line Rx) of another bluetooth device. The bluetooth addresses of the two bluetooth devices are interchanged to each other, and the opposite bluetooth address is stored in the bluetooth address memory 12 through the CPU 11. Therefore, the preceding memorized bluetooth address can be stored in the bluetooth address memory 12, a user needs not to make the three contacts to contact the opposite three contacts to interchange the bluetooth addresses with each other every time before the power source is switched on. That is to say, the contact procedure between the contacts can be neglected before the power source is switched on, if the object that the bluetooth device wants to be connected with is not changed. The external device connection interface 16 is used to connect with outside devices, such as a computer, modem, keyboard or mouse so as to provide a bluetooth transmission function to the outside device. Moreover, the speaker 14 or photodiode 15 can further be installed in the bluetooth device to prompt the success or the failure of the connection. A user can separate the two bluetooth devices to start the wireless transmission function, if the connection is successful. A different warning coming from the speaker 14 or photodiode 15 to prompt the user, the user can switch off the power switch and restart the connection procedure.

Figure 2:
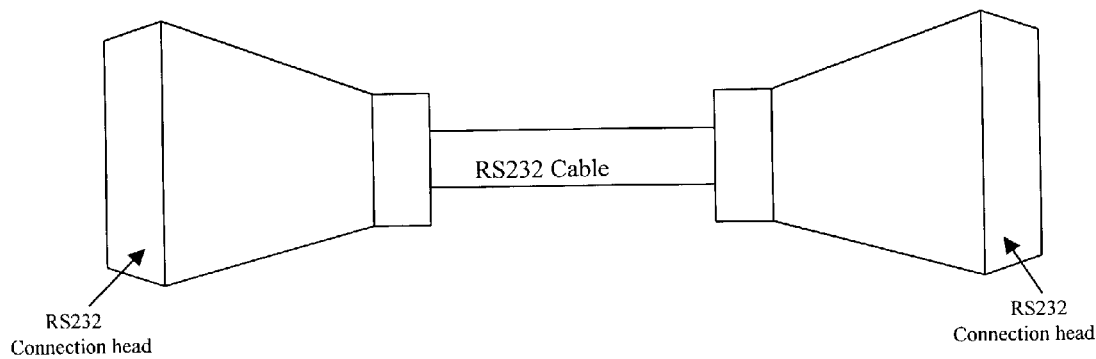
FIG. 2 is a schematic view, showing the traditional RS232 cable used to connect a computer with a peripheral device.
Figure 3:
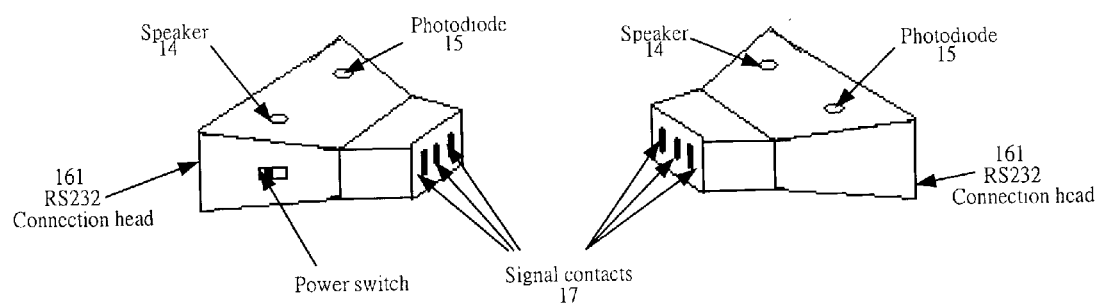
FIG. 3 is a schematic view, showing a wireless transmission device used to replace the RS232 cable according to a preferred embodiment of the present invention.

Referring to FIG. 2 and FIG. 3 now, a traditional RS232 cable used to connect a computer and peripheral device is shown in FIG. 2, it belongs to a wire transmission. The pin of the RS232 cable must be inserted into a socket of the bluetooth device when it is used in the transmission of the two bluetooth devices. This transmission type is more troublesome and complex. Therefore, a simpler device used to replace the RS232 cable is disclosed in the present invention, it is a wireless transmission device according to the method of the present invention, as FIG. 3 shows. The user only needs to put the three signal contacts 17 of the two bluetooth devices to contact each other, then open the power sources of the two bluetooth devices, the bluetooth addresses of the both bluetooth devices are interchanged with each other through the contacts to build a wireless transmission. The photodiode 15 or the speaker 14 is used to prompt the user if the connection is successful. Thereafter, the user separates the two bluetooth devices, and inserts RS232 connection heads 161 into a computer and a peripheral device to start a wireless transmission function. Therefore, such kind of wireless transmission is faster and more convenient.

Figure 4:
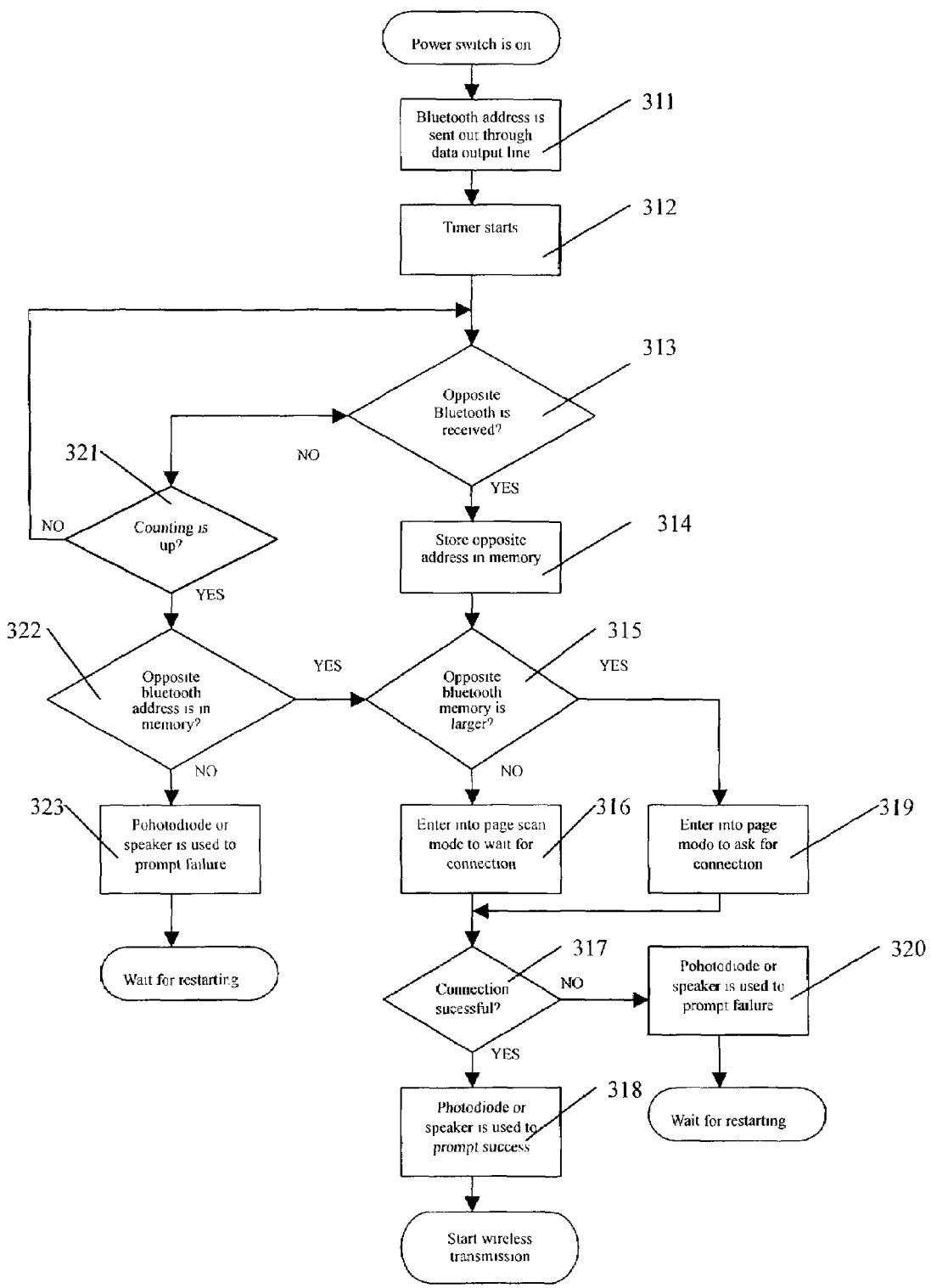
FIG. 4 is a flow chart, showing operation steps of a fast connection establishment of a bluetooth device according to a preferred embodiment of the present invention.

Finally, please refer to FIG. 4. FIG. 4 shows an operation flow of a fast connection establishment for a bluetooth device. First, put the three signal contacts of a bluetooth device to contact with the three signal contacts of another bluetooth device before power source is switched on, then the power source is switched on. A timer is started to count (step 312) after a bluetooth address is sent out through a data output line of the bluetooth device (step 311). Meanwhile, the bluetooth checks whether a bluetooth address of the opposite bluetooth device is received (step 313). If it is, the bluetooth address of the opposite bluetooth is stored in a bluetooth address memory (step 314). Thereafter, the bluetooth device checks whether the opposite bluetooth address is larger than its own bluetooth address (step 315). If it is not, the bluetooth device enters into a page scan mode to wait for a connection (step 316), checks whether the connection is successful (step 317). If the connection is successful, a photodiode is lighted or a speaker is sounded to prompt a success message (step 318), then a wireless transmission function is started. If the connection fails, a different type of the illumination of the photodiode or the sound of the speaker is used to prompt a failure (step 320), then the bluetooth device is switched on again to restart the connection procedure. If the opposite bluetooth address is larger at the step 315, the bluetooth device enters into a page mode to ask for a connection (step 316), then, goes to the step 317 to continue the following steps. But, if the bluetooth address of the opposite bluetooth device is not received at the step 313, checks whether the counting of the timer is up (step 321). If the counting is not up, then go back to the step 313, the bluetooth device continues to check whether the opposite bluetooth address is received through the data input line. If the counting is up, the bluetooth address memory is checked whether the opposite bluetooth address is stored in it (step 322). If it is, enter into the step 315, and the bluetooth device continues to check whether the opposite bluetooth address is larger than its own bluetooth address, then go to the next step. If the opposite bluetooth address is not stored, take a different type of the illumination of the photodiode or sound of the speaker to prompt a failure (step 323), which is same as the step 320. And then, the bluetooth device is switched on again and the connection procedure is restarted.

The method that the three standard signal contacts of the bluetooth devices are made to contact with another three contacts of the opposite bluetooth device so as to activate the bluetooth connection procedure according to the present invention can reduce the time for a bluetooth device to search another bluetooth device and can be used in the devices without user interfaces.

What is claimed is:

1. A fast connection establishment method for a bluetooth device, wherein a bluetooth module a bluetooth address memory, a CPU and an outside device connection interface are mainly installed in the bluetooth device, said method comprising the following steps:
  a. contacting three signal contacts of said bluetooth device with three signal contacts of another bluetooth device, and then interchanging respective bluetooth addresses of the bluetooth device and said another bluetooth device after said bluetooth devices are switched on;
  b. using said bluetooth address memory of said bluetooth device to store said bluetooth address of said another bluetooth device;
  c. said bluetooth address being sent out from said bluetooth device after said bluetooth device is switched on; and
  d. a bluetooth connection procedure being activated if said bluetooth address of said another bluetooth device is received in a specific time,
  whereby a connection is built between said two bluetooth devices so as to provide a wireless transmission function.

2. The method of claim 1, wherein said three signal contacts of said bluetooth device are connected with a data input line, ground line and data output line respectively.

3. The method of claim 1, wherein said connection interface is used to connect said bluetooth device with an outside device.

4. The method of claim 3, wherein said connection interface is an RS232 or a USB interface.

5. The method of claim 3, wherein said outside device is a computer, a modem, a keyboard or a mouse.

6. The method of claim 1, wherein said bluetooth device further comprises a speaker or a photodiode, used to announce the success or failure of said bluetooth connection.

7. The method of claim 1, wherein at said (d) step, said bluetooth device enters into page scan mode to wait for a connection, if said bluetooth address of said opposite bluetooth device is larger than said bluetooth address of said bluetooth device after said bluetooth connection procedure is activated.

8. The method of claim 1, wherein at said (d) step, said bluetooth device enters into page mode to ask for building a connection, if said bluetooth address of said opposite bluetooth device smaller than said bluetooth address of said bluetooth device after said bluetooth connection procedure is activated.

9. The method of claim 1, wherein said bluetooth device further comprises a connection interface to connect said bluetooth device with an outside device.

10. The device method of claim 9, wherein said bluetooth device further comprises a speaker or a photodiode, used to announce the success or failure of said bluetooth connection.

11. The method of claim 1, wherein said bluetooth device further comprises a wireless transmission device, used to replace a RS232 cable, mainly comprising an RS connection head connected to a computer or a peripheral device; said three signal contacts of said bluetooth device including data contacts including a data output line, a ground line and a data input line; whereby a wireless transmission is processed between said two bluetooth devices after said three contacts of said both bluetooth devices are contacted.

* * * * *